United States Patent [19]
Lorts

[11] Patent Number: 5,195,323
[45] Date of Patent: Mar. 23, 1993

[54] TURBOCHARGER-EXHAUST PURIFIER WASTEGATE

[76] Inventor: Anthony R. Lorts, 3366 Talbott, Troy, Mich. 48083

[21] Appl. No.: 738,318

[22] Filed: Jul. 31, 1991

[51] Int. Cl.$^5$ ............................ F02B 37/00; F01N 5/04
[52] U.S. Cl. ........................... 60/602; 60/280; 60/288
[58] Field of Search ............... 60/600, 601, 602, 603, 60/280, 288

[56] References Cited

U.S. PATENT DOCUMENTS

| | | | |
|---|---|---|---|
| 3,988,891 | 11/1976 | Hoyler | 60/288 |
| 4,202,176 | 5/1980 | Mezger | 60/600 |
| 4,235,076 | 11/1980 | Meloche et al. | 60/602 |
| 4,244,187 | 1/1981 | Lane | 60/602 |
| 4,404,804 | 9/1983 | Tadokoro et al. | 60/602 |
| 4,437,311 | 3/1984 | Iwamoto | 60/602 |
| 4,444,012 | 4/1984 | Gauffres | 60/602 |

FOREIGN PATENT DOCUMENTS

| | | | |
|---|---|---|---|
| 2483515 | 12/1981 | France | 60/602 |
| 93615 | 6/1982 | Japan | 60/602 |

*Primary Examiner*—Michael Koczo

[57] ABSTRACT

In an internal combustion engine incorporating an exhaust driven turbocharger and an exhaust purification device, a valve means located at the diverging point of a branched exhaust duct with separate conduits leading to the turbocharger turbine and exhaust purification device. The valve means acts to alternately direct engine exhaust gas into a conduit leading to an exhaust purification device, or into another conduit leading to the turbine of a turbocharger, depending upon the particular fuel and fuel/air mixture utilized.

7 Claims, 1 Drawing Sheet

TURBOCHARGER-EXHAUST PURIFIER WASTEGATE

BACKGROUND OF THE INVENTION

1. Field of the Invention

The present invention relates to turbocharged internal combustion engines and is directed at maximizing the efficient use of a catalyst and a bypass circuit in an engine capable of multi-fuel stoichiometric and lean-burn combustion strategies and combinations thereof.

2. Description of the Prior Art

Workers in the art of the internal combustion engine at this time are engaged in attempting to reduce exhaust emissions through the use of exhaust purification devices. These devices can reduce engine efficiency by impeding the flow of engine exhaust and in the case of catalysts, often require stoichiometric fuel-air ratios and operation within a narrow temperature range for optimal performance. With catalyst temperature below the optimum range or engine fuel-air ratios excessively rich or lean as typically occurs during engine start and warm up, catalyst performance in breaking down undesirable emissions is highly impeded. Alternatively, exhaust purification devices can overheat by excessive exhaust flow or the ingestion of unburned fuel. The placement of a turbine in the exhaust duct leading to a catalyst for the purpose of driving a turbocharger compressor can absorb heat necessary for catalyst operation.

The clean burning characteristics of fuels such as natural gas offer the possibility of obtaining low exhaust emissions without exhaust after-treatment. This invention is directed at providing an efficient means of controlling exhaust emissions and improving efficiency in multi-fuel turbocharged engines by facilitating the employment of both a supercharged operating mode without exhaust after-treatment for use with a suitable fuel such as natural gas employed in a lean fuel-air mixture, and a naturally aspirated mode utilizing an exhaust catalyzer for stoichiometric fuel air mixtures at low power settings. Another object of the invention is to improve engine efficiency by reducing exhaust backpressure. An additional object of the invention is to facilitate the dual use of either a fuel compatible with supercharged, non-catalyst operation such as natural gas, or a fuel requiring stoichiometric mixtures with a catalyst, such as gasoline. Further objects of the present invention include facilitating rapid heating of an exhaust catalyst during engine start and the avoidance of overheating the catalyst during high power operation.

SUMMARY OF THE INVENTION

This invention consists of a means of directing the flow of an engine's exhaust in varying proportion to either an exhaust purification device such as a catalyst, or to the turbine of a turbocharger. The invention is directed at engines primarily designed to utilize lean fuel-air ratios at high output levels with suitable fuels such as natural gas, and stoichiometric fuel-air ratios when operating at lower power levels and when employing fuels requiring catalytic after treatment. It employes a variation of what is commonly referred to as a wastegate, which is a valve assembly located in the exhaust duct between the engine cylinders and the turbocharger turbine, which opens into a turbine bypassing conduit when turbocharger output reaches a limit. The wastegate and its associated bypassing conduit are typically opened by a pressure diaphragm which communicates with compressor output. The wastegate may be actuated by a valve such as a solenoid acting either separately or in conjunction with a diaphragm, in response to the selection of an alternate fuel not requiring catalytic after-treatment.

The present invention employs a valve means located in a branched exhaust pipe between the engine cylinders and the turbocharger turbine at a point where the exhaust pipe splits into two diverging ducts, one duct continuing on into the turbine housing, and the other leading to an exhaust purification device such as a catalyst. The valve means of the present invention acts as a vane to direct continuously variable proportions of the engine exhaust to either or both the exhaust purification device or the turbocharger turbine. It should be noted that in the present invention exhaust directed to either the purification device or the turbocharger follows an exclusive path through each device prior to passing to the atmosphere, and that the turbocharger and purification device are not in series. dr

DESCRIPTION OF THE DRAWING

The single FIGURE represents a side view of the present invention showing a branched exhaust duct leading from an engine with separate conduits leading to an exhaust purification device and a turbocharger turbine housing.

DETAILED DESCRIPTION OF THE PREFERRED EMBODIMENTS

Figure 1:
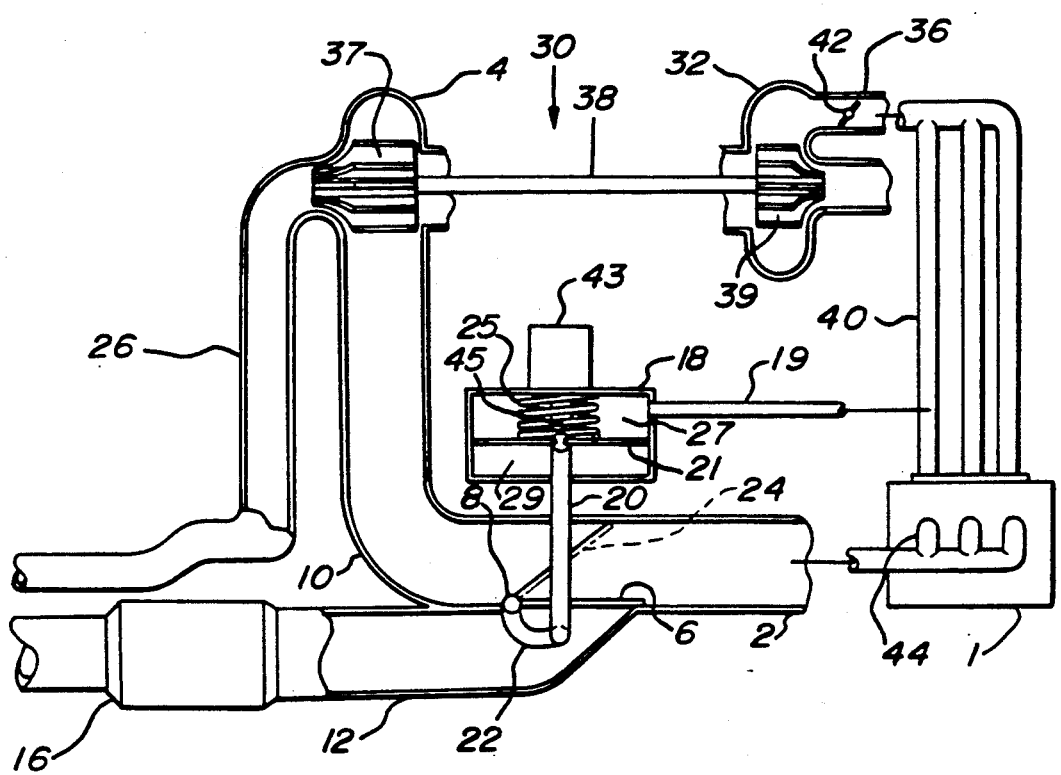

In the FIGURE showing the present invention an exhaust pipe 2 leads from the cylinders of an internal combustion engine represented at 1 having an inlet manifold represented at 40 and an exhaust manifold represented at 44. Exhaust pipe 2 leads to a point where it splits into two separate conduits 10 and 12. Conduit 10 directs exhaust gas to the turbine 37 of a conventional turbocharger 30, while conduit 12 directs exhaust gas to an exhaust catalyst 16. At the point where exhaust pipe 2 splits into conduits 10 and 12 is a shaft, the end of which is depicted at 8, upon which pivots a flap-valve 6. The valve 6 may be controlled by various means. In this example of the present invention flap valve 6 is activated by a diaphragm device 18 having a diaphragm 21 biased by a spring 25, which acts upon a control rod 20 and lever 22 connected to shaft 8. Located on top of diaphragm 18 is a valve 43 which may be a solenoid which activates a control rod 45 to override the force exerted by spring 25. Diaphragm device 18 has a chamber 27 on one side of diaphragm 21 communicating with the engine inlet manifold through conduit 19, and a chamber 29 vented to the atmosphere.

Conduit 10 is formed by the inlet of turbine housing 4 of a conventional turbocharger 30. Turbocharger 30 has a compressor housing 32 which discharges compressed air to the engine inlet via the duct 36, which contains a throttle valve 42. Conduit 12 directs exhaust gas to a catalyst 16 when flap valve 6 is positioned as shown by the dashed lines at 24, closing off conduit 10. Alternatively, when conduit 12 is fully closed off by flap valve 6, exhaust flows into turbine housing 4 through conduit 10 where it activates a turbine wheel 37 which drives a shaft 38 connected to a compressor 39 located in compressor housing 32 to supercharge the engine in the conventional manner. Diaphragm 21 acts to move flap valve 6 to the position of the dashed lines 24 in response to atmospheric pressure from chamber 29 acting against spring 25, when vacuum from the engine inlet 40 is communicated to chamber 27 through conduit 19, as occurs when throttle valve 42 creates a restriction in engine inlet 36. Increasing inlet manifold pressure caused by opening engine throttle 42 permits spring 25 to drive diaphragm 21 toward atmospheric vented chamber 29, causing valve 6 to close conduit 12 and open conduit 10. Spring 25 thus acts against diaphragm 21 to hold valve 6 in the catalyst bypassing position, activating the turbocharger 30 when inlet manifold vacuum is low and engine output demand is increasing. Valve 43 such as a solenoid valve may be activated by the engine operator to override diaphragm device 18 in order to hold valve 6 continually either in its illustrated catalyst bypassing position, or in position 24 to direct all exhaust through the catalyst in response to operator selection of fuels requiring exclusively catalyzed or exclusively non-catylized exhaust treatment in an engine capable of utilizing multiple fuels. Alternatively, valve 43 may operate as a modulating valve responsive to parameters sensed in engine management control computer 46 and may be employed exclusively in place of diaphragm 18. The valve 43 responds to electric current sent from the engine management control computer 46 that responds to operating variables such as manifold vaccum and operator fuel selection. After passing through turbine housing 4, exhaust gasses then exit to the atmosphere via conduit 26. In this embodiment of the present invention, exhaust conduit 26 is placed in contact with the exterior encasement of catalyst 16 to aid in maintaining the catalyst 16 at as close as possible to optimum temperature while valve 6 is at its illustrated catalyst bypassing position.

PREFERRED OPERATION DESCRIPTION

The flap valve 6 of the present invention functions to direct all or part of the exhaust flow into the conduit 12 leading to catalyst 16 when the engine is operating in a low power naturally aspirated mode with a fuel-air ratio suited for the operation of catalyst 16. This serves to heat the catalyst 16 faster than would be the case if exhaust gas passed through the turbocharger turbine housing 4 before passing into the catalyst 16. (See U.S. Pat. No. 4,235,076, Meloche, Bland, Terry, 1980 and U.S. Pat. No. 4,437,311, Iwamoto, Omato, 1984)

In the preferred embodiment of the present invention when power demand increases with a suitable fuel capable of use without after-treatment, such as natural gas under certain lean-burn conditions, diaphragm device 18 responds to increasing engine inlet pressure caused by the opening of the throttle valve 42 to move flap valve 6 away from the position depicted by the dashed lines 24 toward the position illustrated, closing off the conduit 12 leading to the catalyst 16 while opening conduit 10 leading to the turbocharger turbine housing 4. Exhaust gas directed into the turbocharger turbine housing 4 increases the speed of the enclosed turbine 37 which in turn increases the speed and output of the compressor 39, thereby increasing airflow to the engine, facilitating the leaning of the fuel-air ratio during high engine output, which simultaneously reduces and eliminates the need of the bypassed catalyst 16.

The flap valve 6 of the present invention thus serves to modulate the direction of exhaust flow between the catalyst 16 and the turbocharger turbine 4 in response to power demands on the engine when a suitable fuel is utilized which allows stoichiometric fuel air mixtures at low power operation with exhaust after-treatment, and lean fuel-air mixtures without after-treatment at high power operation. A secondary function of valve 6 is to direct all engine exhaust gas around the turbocharger turbine housing 4 into the exhaust catalyst 16 during operation with fuels requiring exclusively stoichiometric fuel-air ratios with catalytic after-treatment. This secondary function is accomplished here by means of valve 43 which may be a solenoid co-axially located adjacent to diaphragm device 18. Valve 43 here acts to pull diaphragm 21 up against spring 25 with a control rod 45 that passes through spring 25, in response to either automatic or manual switching means, such as an engine management control computer 46 responding to parameters such as manifold and atmospheric pressure, or an operator controlled switch activated in order to change fuels. The engine management control computer 46 can be operator actuated for switching to manual mode or automatic mode of operation.

Solenoid 43 may be employed to act on diaphragm 21 to cause valve 6 to operate as a conventional wastegate by employing inlet manifold pressure sensing and activating means to cause valve 6 to open conduit 12 when excessive levels of compressor outlet occur. While my above description contains many specificities, these should not be construed as limitations on the scope of the invention but rather as an exemplification of one embodiment thereof. Other variations are possible. For example poppet type changeover valves could be substituted for flap-valve 6, and a single computer controlled solenoid could be substituted for diaphragm device 18 and solenoid 43. Accordingly, the scope of the invention should not be determined by the embodiments illustrated, but by the appended claims and their legal equivalents.

I claim:

1. A wastegate exhaust gas control system for an internal combustion engine, said internal combustion engine including an intake manifold and an exhaust manifold said control system comprising:
    an exhaust duct connected to said exhaust manifold and bifurcated at a branch point into a first and second branch;
    a valve disposed in said exhaust duct at said branch point;
    said first branch of said duct connected to a turbocharger;
    a first vent from said turbocharger to atmosphere;
    said second branch of said duct connected to an exhaust purifier;
    a second vent from said exhaust purifier to atmosphere; and
    means for controlling said valve means directing continuously variable proportions of said exhaust between said first and second branches of said duct.

2. The control system for an internal combustion engine according to claim 1 wherein said means for controlling includes:
    a diaphragm being actuated by vaccum pressure in said intake manifold.

3. The control system for an internal combustion engine according to claim 2 further comprising:
    a solenoid, said solenoid being actuated to override said diaphragm.

4. The control system for an internal combustion engine according to claim 3 further comprising:
    means for automatic switching wherein said solenoid is controlled by means for automatic switching.

5. The control system for an internal combustion engine according to claim 4 wherein said means for automatic switching is an engine management control computer.

6. The control system for an internal combustion engine according to claim 3 further comprising: means for manual switching wherein said solenoid is controlled by said means for manual switching.

7. The control system for an internal combustion engine according to claim 6 wherein said means for manual switching for controlling said valve means comprises a control rod, said control rod being operator actuated.

* * * * *